July 13, 1943.　　H. B. STONER ET AL　　2,324,040
VENDING MACHINE
Filed Dec. 31, 1938　　12 Sheets-Sheet 2
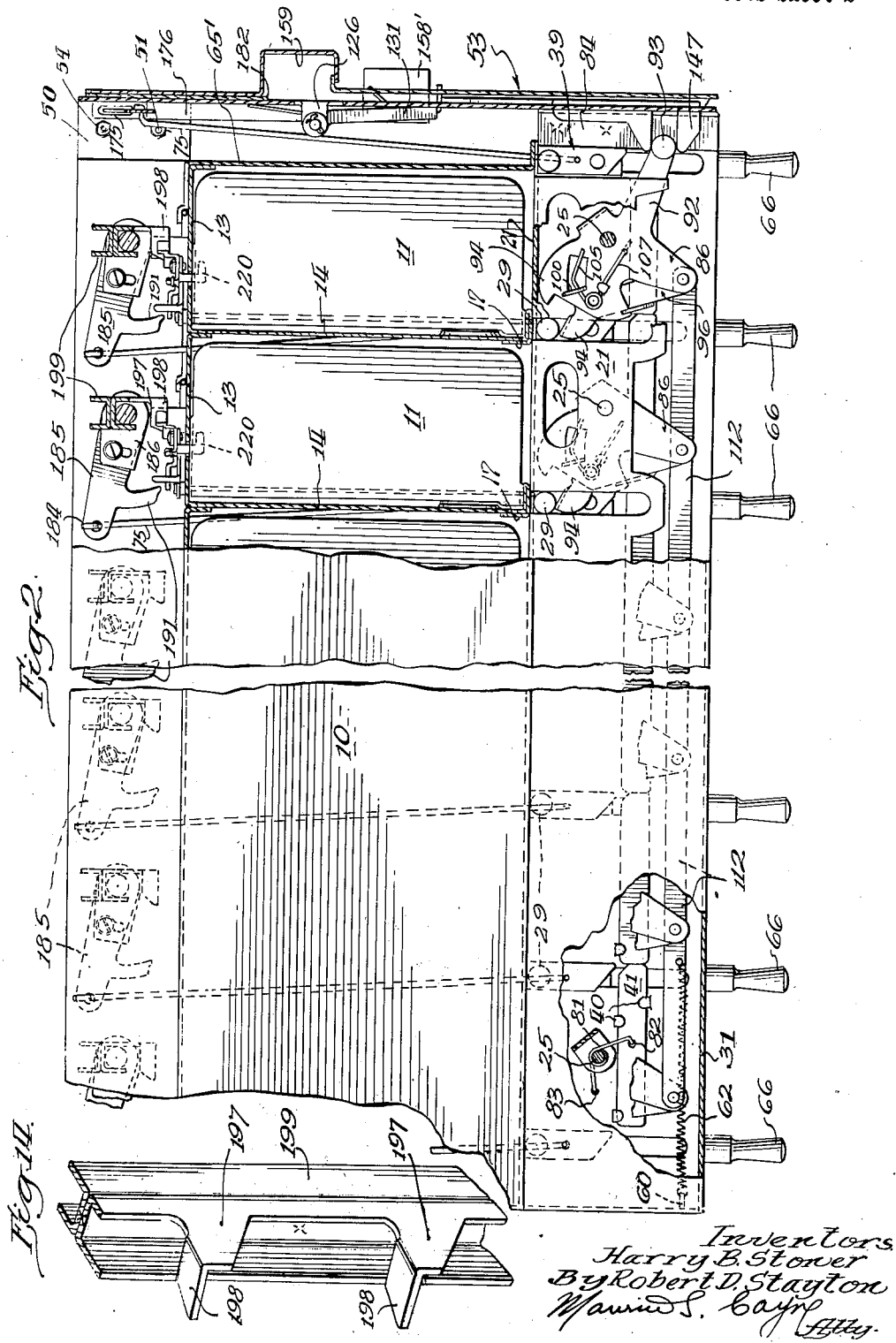

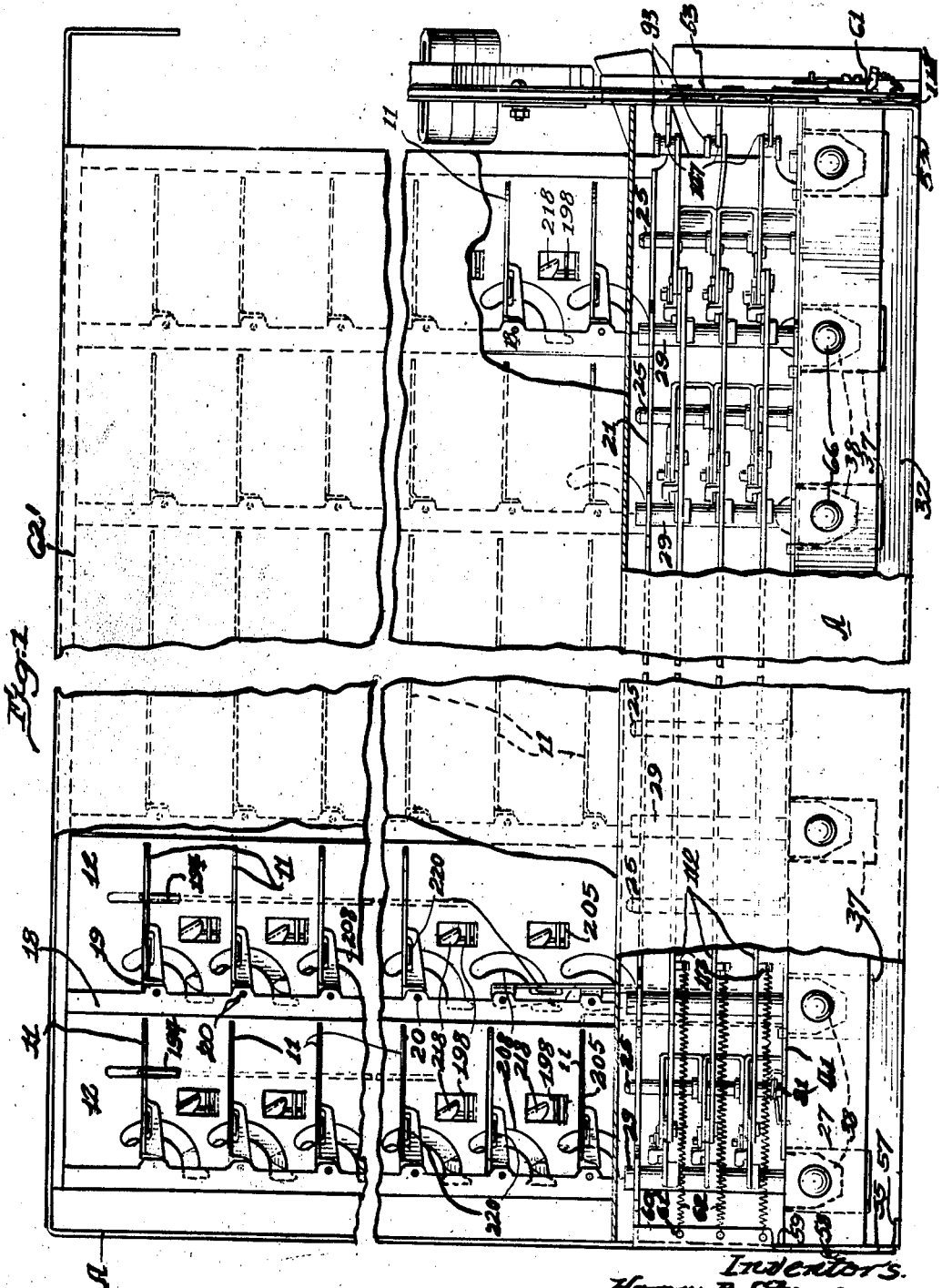

July 13, 1943. H. B. STONER ET AL 2,324,040
VENDING MACHINE
Filed Dec. 31, 1938 12 Sheets-Sheet 3
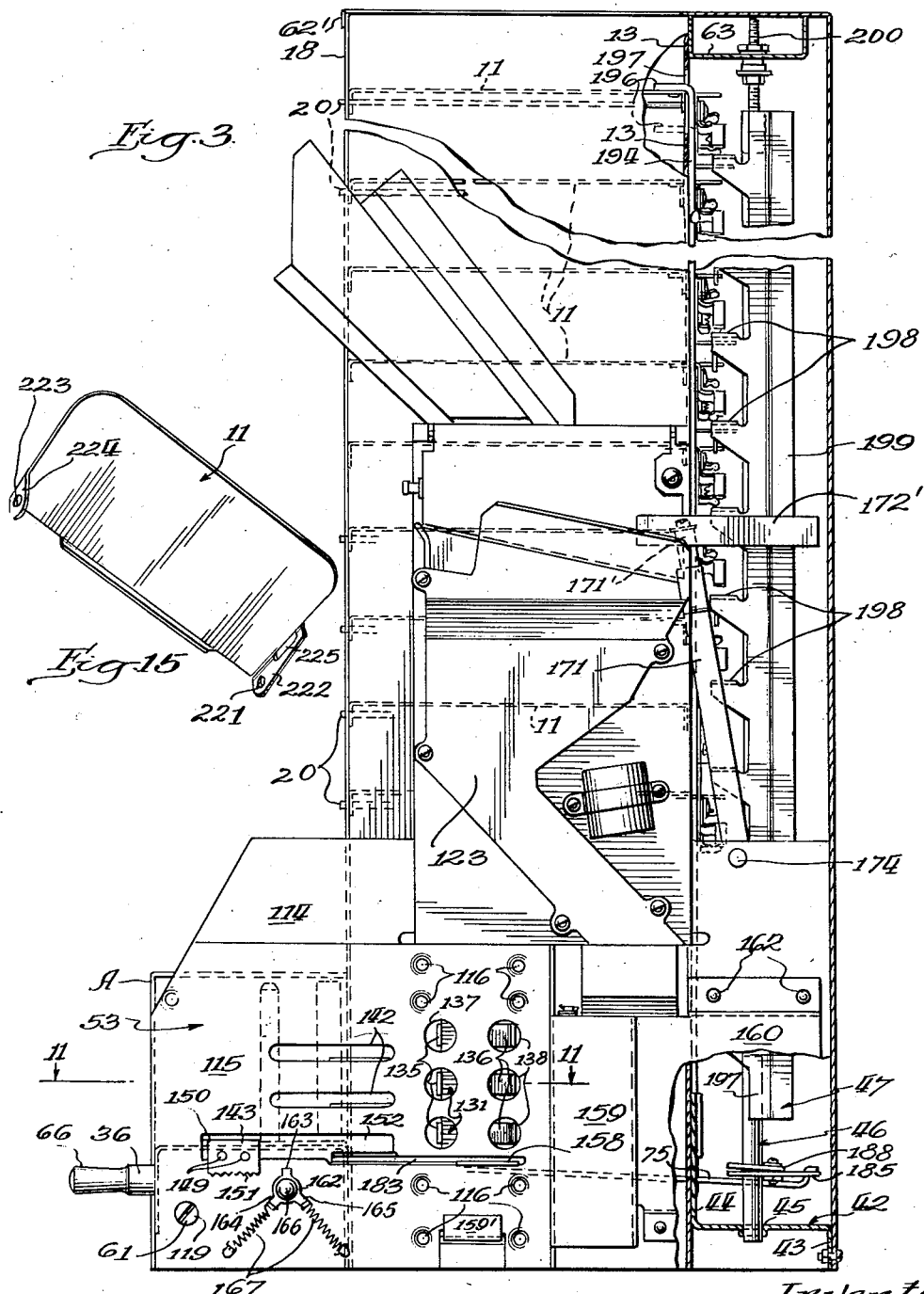
Inventor
Harry B. Stoner
Robert D. Stayton
By Maurice L. Corfe
Atty.

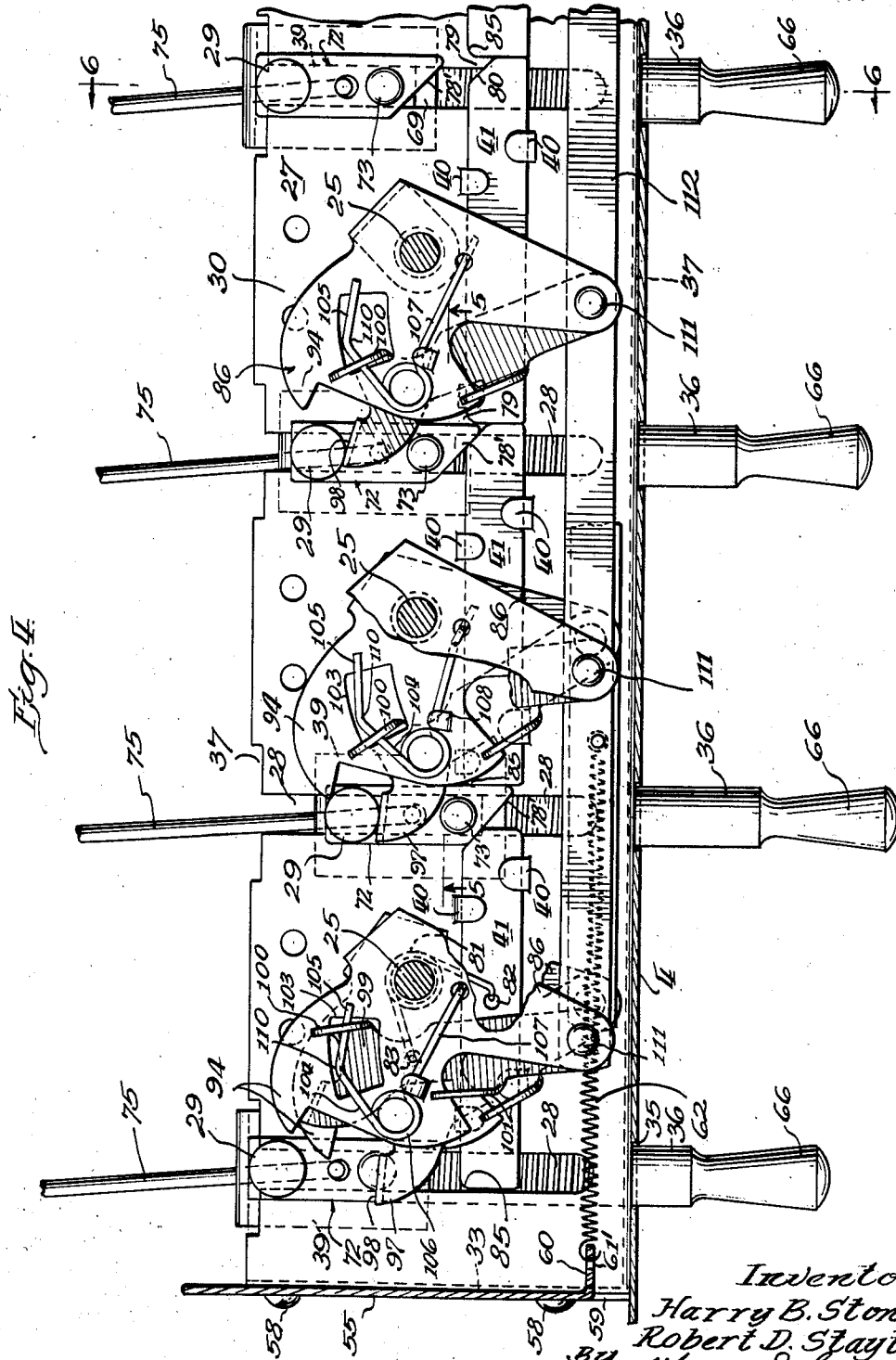

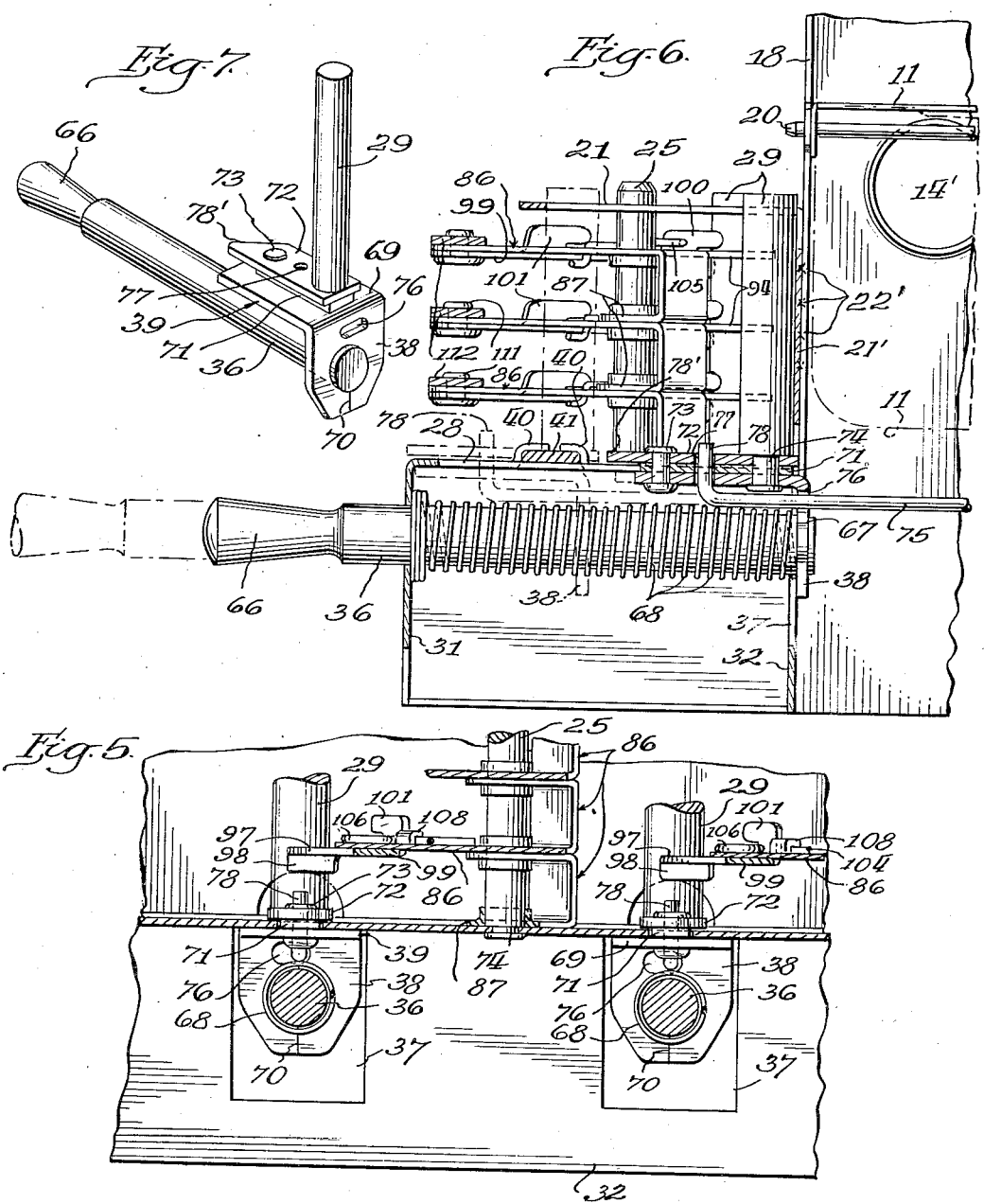

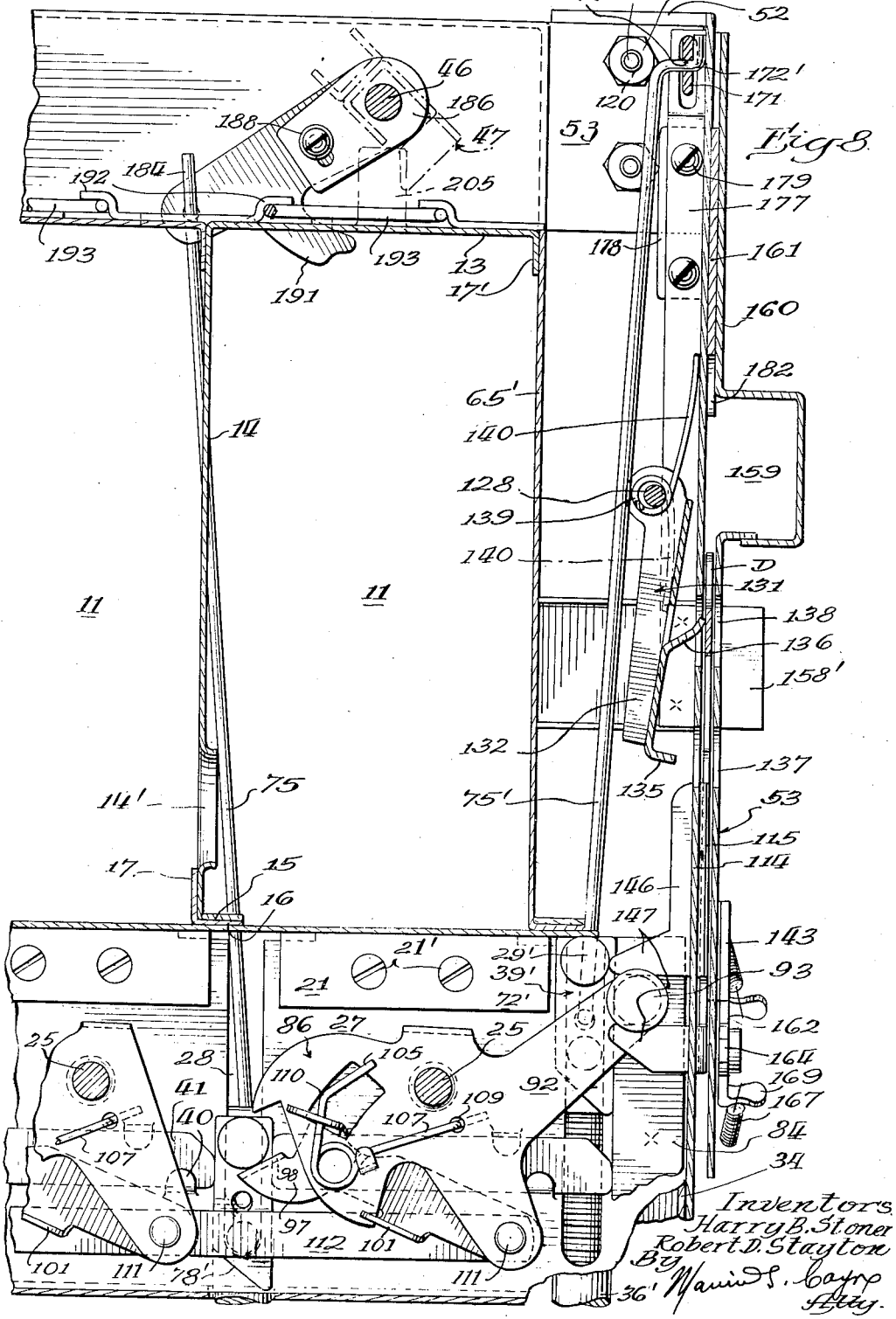

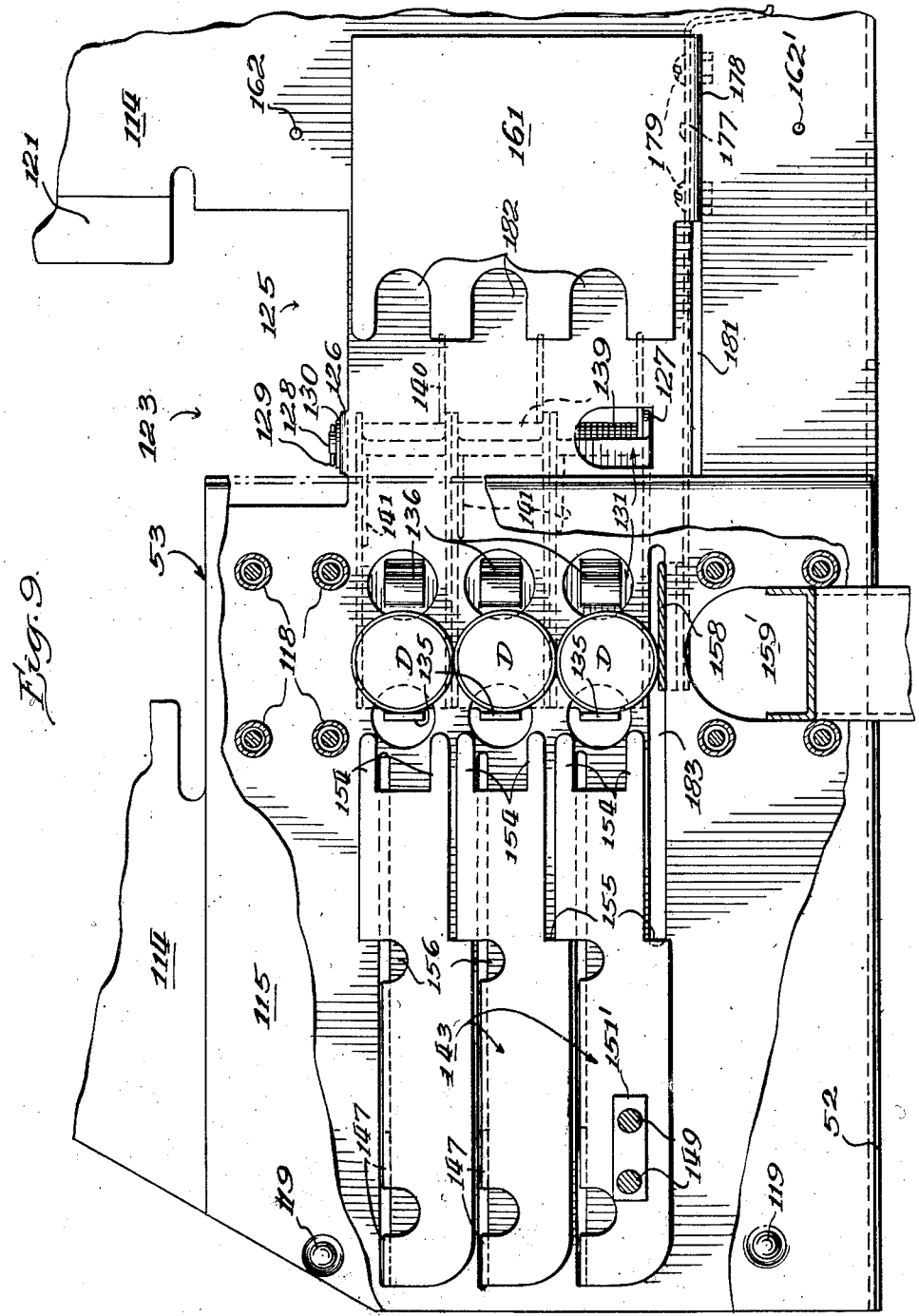

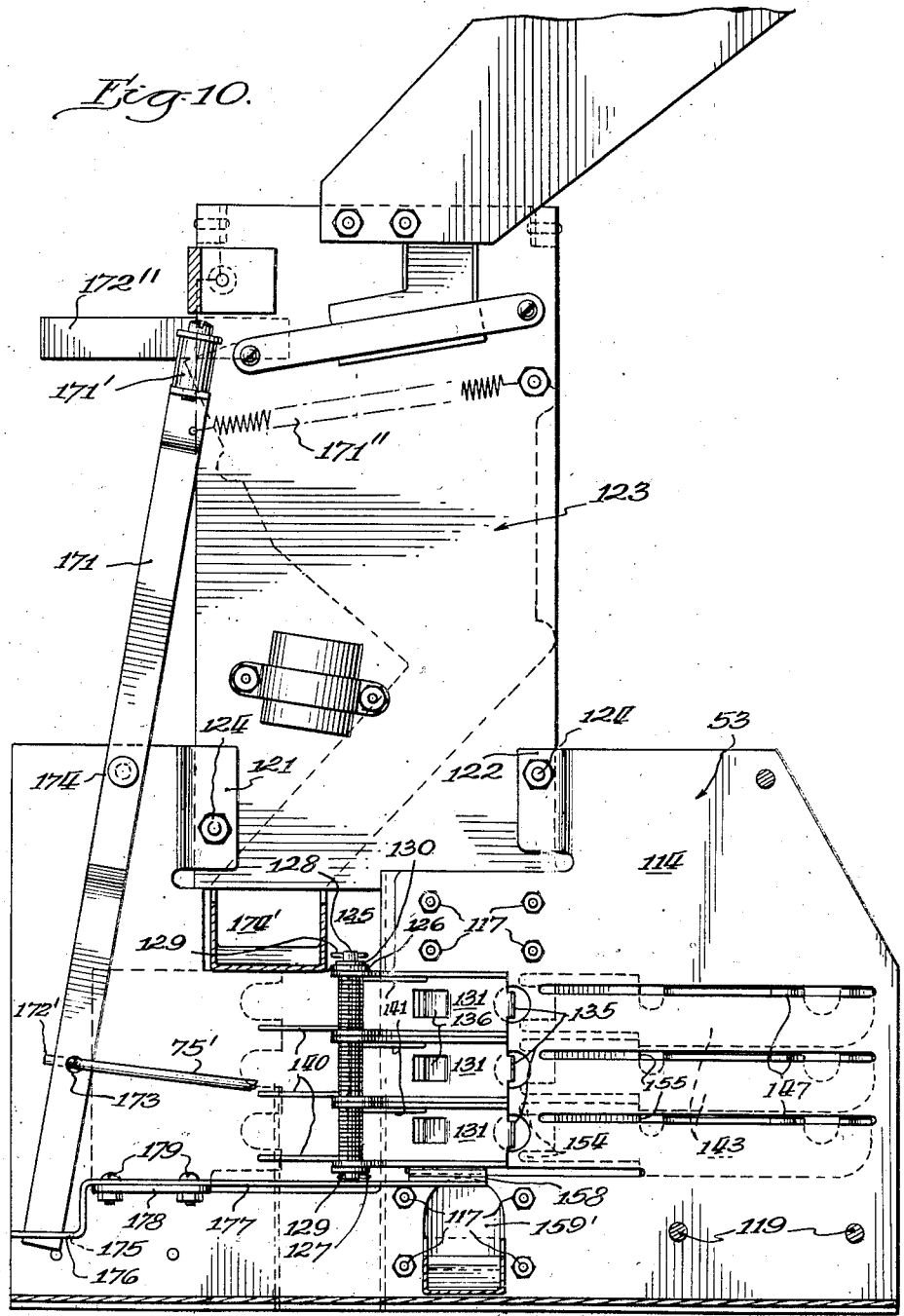

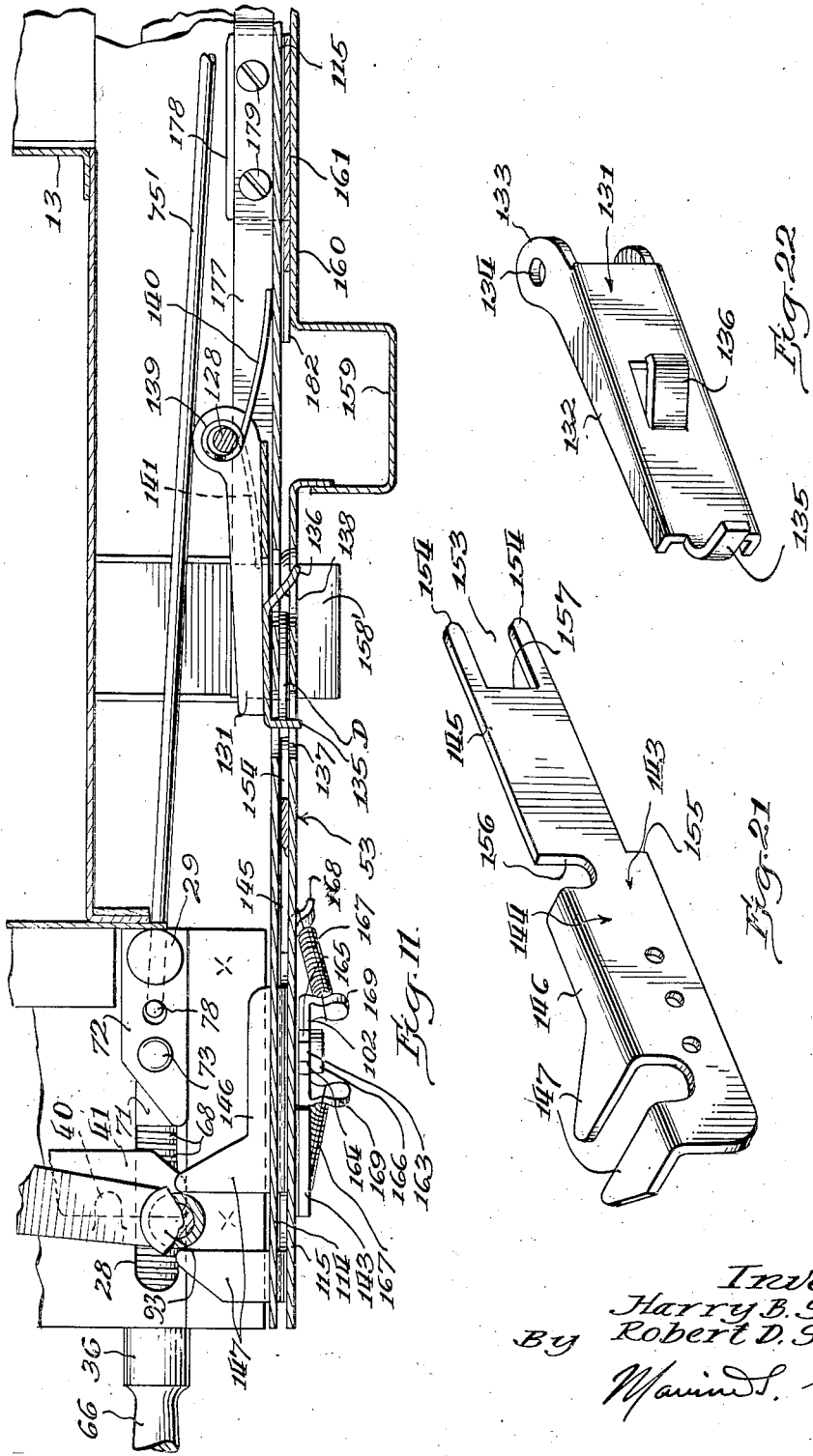

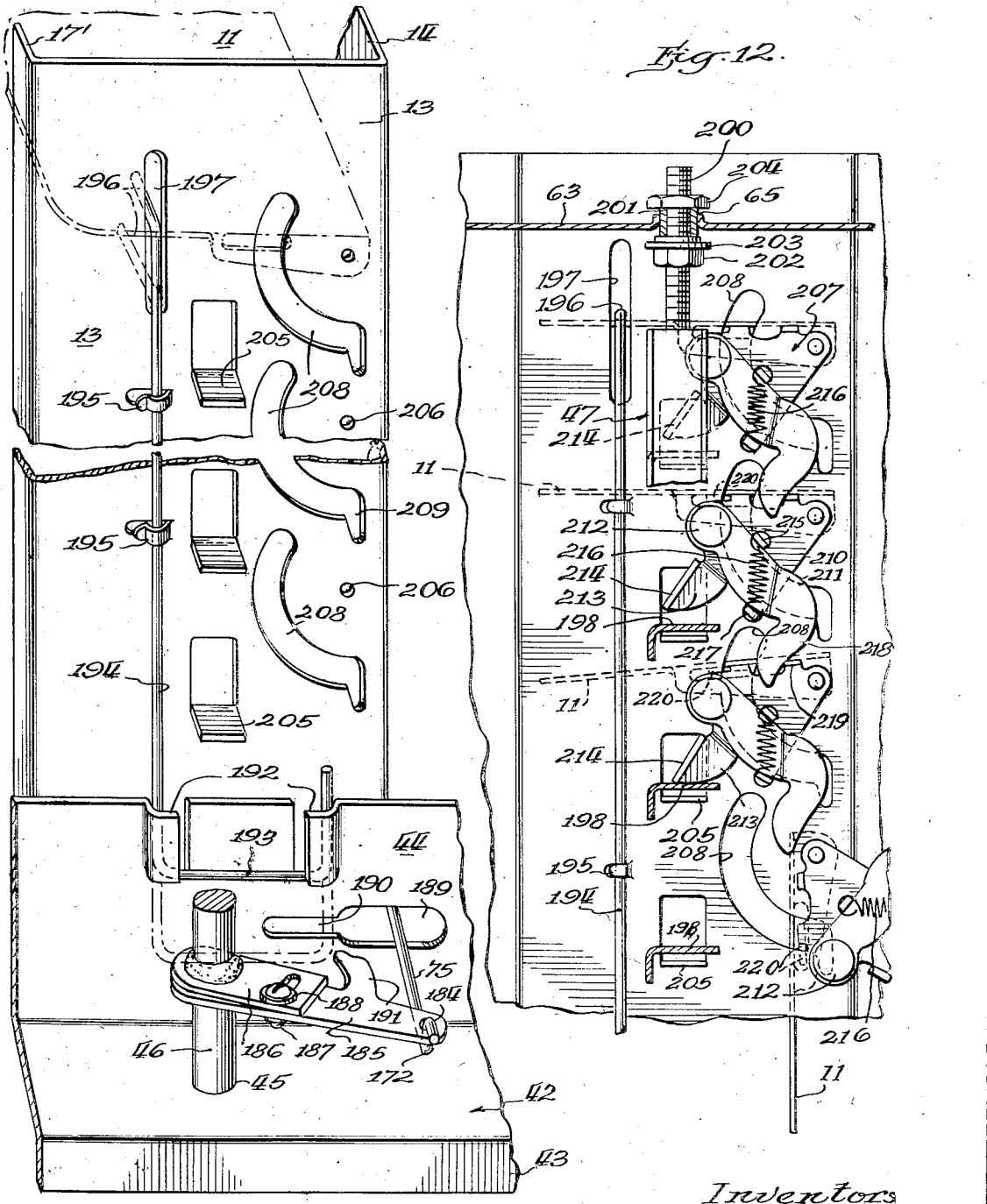

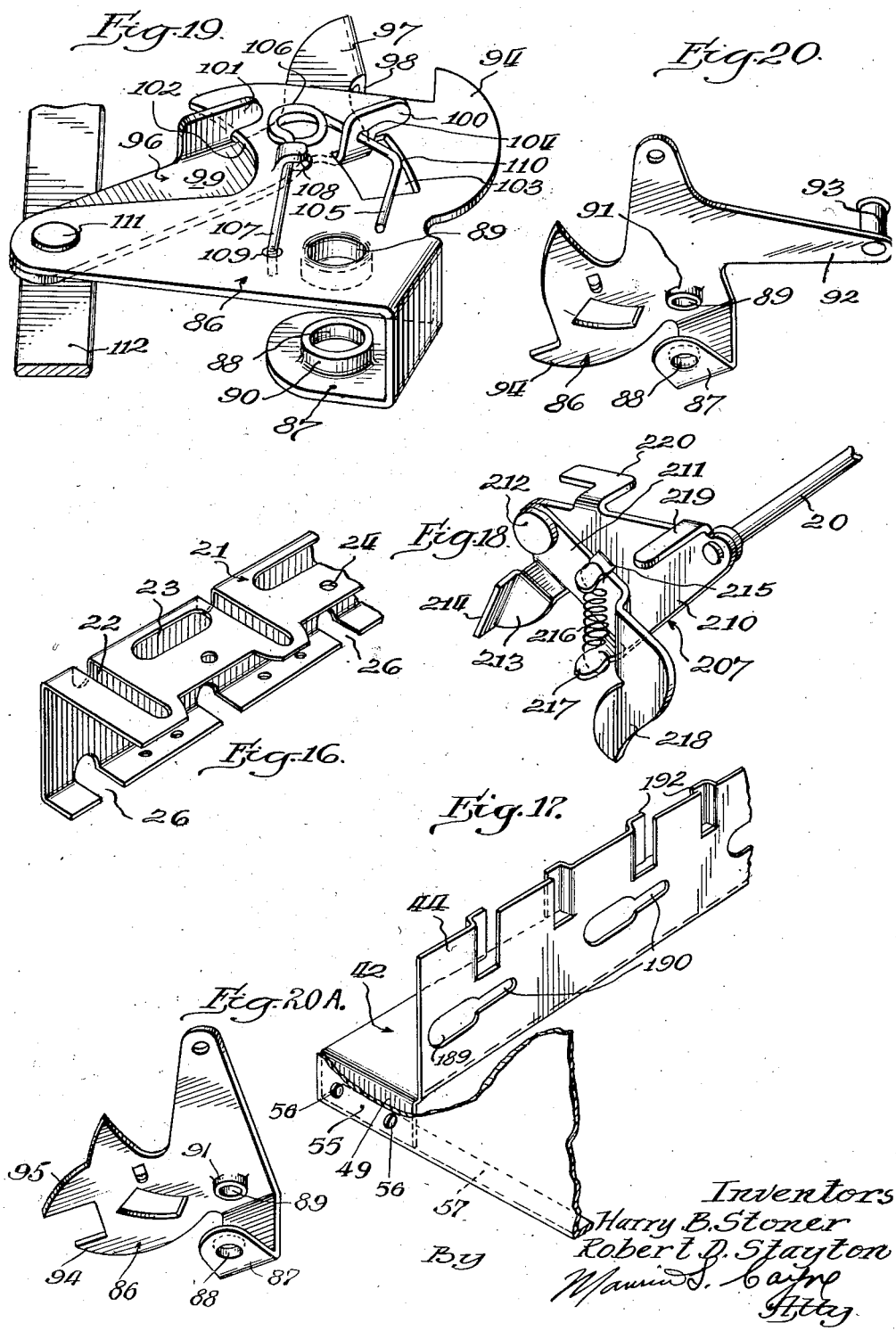

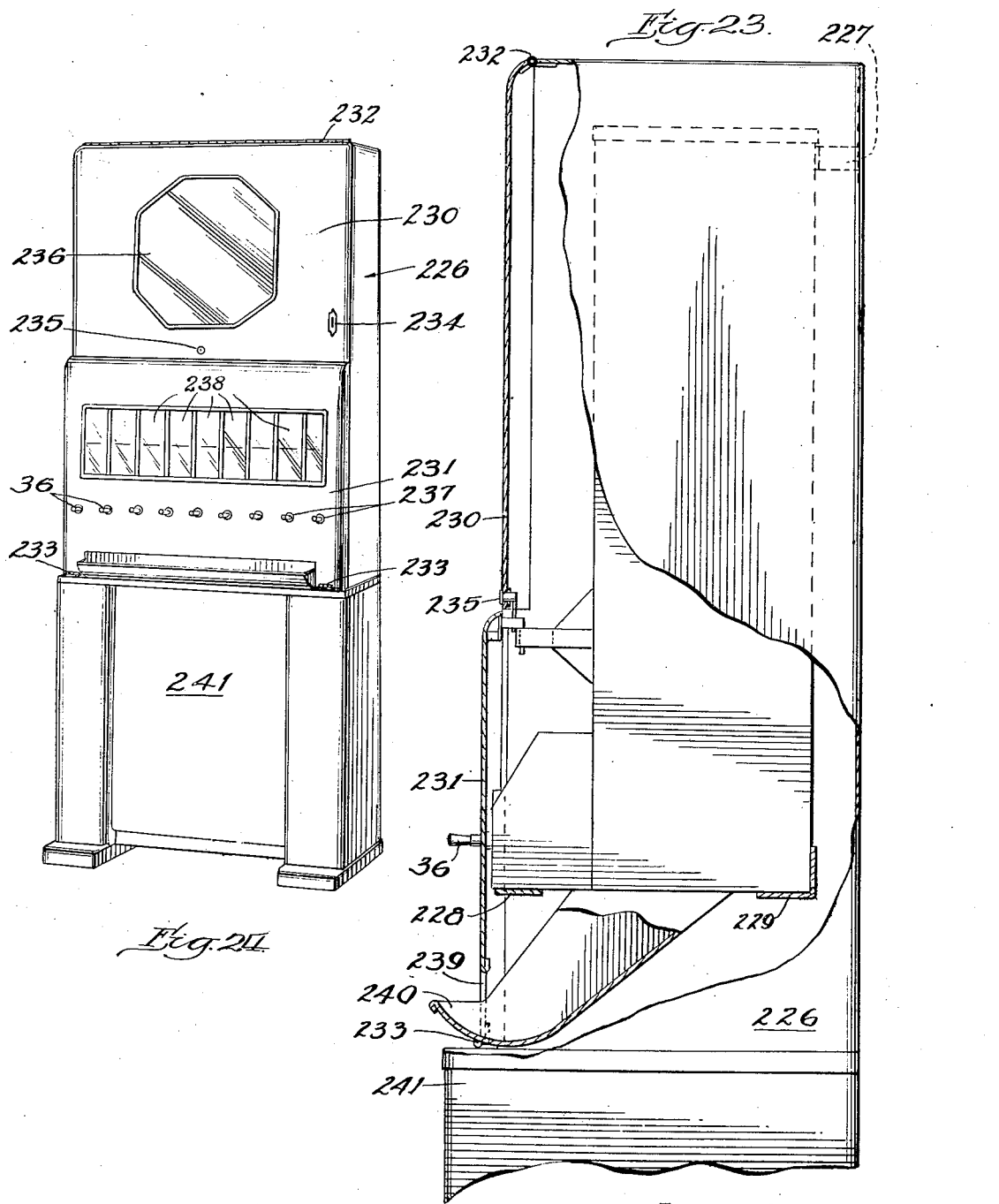

Patented July 13, 1943

2,324,040

UNITED STATES PATENT OFFICE 2,324,040

VENDING MACHINE

Harry B. Stoner and Robert D. Stayton, Aurora, Ill., assignors to Stoner Manufacturing Corporation, Aurora, Ill., a corporation of Illinois Application December 31, 1938, Serial No. 248,658

14 Claims. (Cl. 194—57)

This invention relates generally to vending machines, and more particularly, to machines of this character manually operated by the customer, and has for one of its objects to provide a machine which will permit a customer to choose from several varieties of goods to be purchased, and in which a single coin-control mechanism will be provided to control all the several discharge mechanisms.

Another object of the invention is to provide in a vending machine of the character described, novel and improved means, whereby if a customer, before completing the purchase should decide not to obtain the goods, he may have the deposited coins refunded.

Another object of the invention is to provide in a vending machine of the character described, novel and improved means for retaining several varieties of goods to be vended at different prices, and a single coin-control mechanism for controlling the several discharge mechanisms, said goods being arranged in different stacks, and novel and improved means for adjusting the discharge mechanism from said stacks, whereby the same will be operative to discharge only articles at a predetermined price.

A further object of the invention is to provide in a vending machine of the character described, a novel and improved means for actuating the discharge mechanisms, said discharge mechanisms being readily adjustable so as to render the same responsive to either a single coin or to a plurality of coins of the same denomination.

A further object of the invention is to provide in a machine of the character described, novel and improved means whereby when one of the discharge mechanisms is being actuated, all of the other vending or discharge mechanisms will be locked against operation, thereby rendering it impossible to actuate more than one discharge mechanism at the same time.

A still further object of the invention is to provide in a machine of this character, novel and improved means for indicating to the operator when a certain stack of merchandise is empty.

A still further object of the invention is to provide in a machine of the character described, novel and improved means for maintaining the merchandise therein, said means including stacks containing horizontally disposed shelves upon which the merchandise may be arranged, and novel and improved means for causing said shelves to be successively tilted or dropped from their horizontal position, in order to release the merchandise disposed thereon.

With the foregoing and other objects in view which will appear as the description proceeds, the invention consists in certain novel features of construction, arrangement and combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating the understanding of our invention, we have illustrated in the accompanying drawings a preferred embodiment thereof, from an inspection of which, when considered in connection with the following description, our invention, its mode of construction, assembly and operation, and many of its advantages should be readily understood and appreciated.

Referring to the drawings in which the same characters of reference are employed to indicate corresponding or similar parts throughout the several figures of the drawings:

Fig. 1 is a front elevational view of a vending mechanism embodying the present invention, with parts thereof being broken away to more clearly illustrate details of construction;

Fig. 2 is a plan view of the same with portions thereof being shown in section;

Fig. 3 is a side elevational view of the same with parts thereof being broken away to more clearly illustrate constructional details;

Fig. 4 is a plan view of a portion of the discharge mechanism;

Fig. 5 is a sectional view taken substantially on line 5—5 of Fig. 4;

Fig. 6 is a sectional view taken substantially on line 6—6 of Fig. 4;

Fig. 7 is a view in perspective of one of the plungers and its associated carriage;

Fig. 8 is a transverse sectional view of the right-hand portion of the device, with the plunger controlling the delivery of merchandise from the extreme right-hand stack being shown pulled out its maximum extent;

Fig. 9 is an elevational view of the coin-control mechanism with portions of the front plate thereof being cut away to more fully illustrate constructional details;

Fig. 10 is a rear elevational view of the coin-control mechanism;

Fig. 11 is a sectional view through the coin-control mechanism taken substantially on line 11—11 of Fig. 3;

Fig. 12 is a rear elevational view of the upper part of one of the stacks;

Fig. 13 is a perspective view of the rear of one of the stacks with the release mechanism not shown;

Fig. 14 is a view in perspective of an intermediate portion of one of the vertical release numbers;

Fig. 15 is a view in perspective of one of the horizontally disposed shelves;

Fig. 16 is a view in perspective of a portion of the guide member;

Fig. 17 is a view in perspective of a portion of the rear support member;

Fig. 18 is a view in perspective of one of the shelf releasing mechanisms;

Fig. 19 is a view in perspective of one of the actuating cams or pivoted lever members fully assembled;

Fig. 20 is a view in perspective of one of the extreme righthand actuating cams or pivoted lever members detached from its associated bar;

Fig. 20A is a similar view of a modified form of the cam or pivoted lever member;

Fig. 21 is a view in perspective of the sliding head of the coin-control mechanism;

Fig. 22 is a view in perspective of the spring release member of the coin-control mechanism;

Fig. 23 is a side elevational view of the present device installed within a cabinet, with portions thereof broken away and in section;

Fig. 24 is a perspective view of the device embodied in cabinet, a portion of which is shown in Fig. 23.

Referring to the drawings more specifically by characters of reference, the reference character 10 designates generally a stack of which there may be several arranged side by side in the device, and within which are mounted a plurality of shelves or platforms 11 disposed in spaced relation one above the other to provide a plurality of compartments or cavities 12, said shelves or platforms 11 being hingedly mounted adjacent one side thereof in a manner to be hereinafter more fully described.

The stacks are formed from single longitudinal plates which are bent perpendicularly along one side to form the rear wall 13 and the side wall 14. The front portion is formed by bending the edge opposite to the rear wall 13 parallel to and in the same direction as that wall, as shown at 15, and then bending this edge further upon itself as at 16, so as to bring the same around against the side wall 14 as at 17. This forms the upstanding front angle 18, from which ears 19 are formed, said ears being pierced for the reception of the platform pintle 20.

The rear walls 13 of the said stacks 10 are further bent perpendicularly as at 17' so as to lie adjacent the corresponding side wall of the next adjacent stack. At the bottom of the side wall 14, there is provided an opening 14', which opening is for the purpose of facilitating the servicing of the device. The opening 14' is of such a size as to permit the insertion of a finger or the like therethrough for lifting the bottom platform or shelf 11 when the stack has been emptied of merchandise, so that said platform will catch on the bottom release member and will be held in a raised position by said member in the manner to be hereinafter more fully described.

The stacks are attached at their front ends to a suitable guide member 21 by welding or the like, as shown at 22', said guide member being substantially channel shaped in section with the top arm of said channel being longer than the bottom arm and being provided with guide slots 22, adjusting slots 23 and openings 24, said openings being provided for the accommodation of shafts 25. All of said openings and slots are spaced along the top of said guide member for cooperation with the operating mechanisms for the several stacks 10, which mechanisms will be hereinafter more fully described.

The lower flange of the guide member 21 is attached by any suitable means, such as screws and nuts 21', to the top of the actuating mechanism support 27, said lower flange being provided with recesses 26 which cooperate with similarly placed slots 28 in the actuating mechanism support 27 for the guiding of the actuating bars 29.

The actuating mechanism support 27 comprises a substantially channel shaped member, with the base of the channel forming the top 30 of the support 27, and the arms of the channel section comprising the side walls of the support, the front wall 31, and the rear wall 32. The ends of the support are formed by bending downwardly continuations of the top 30 to form the walls 33 and 34. The front wall 31 of the actuating mechanism support is provided with the openings 35, spaced in accordance with the arrangement of the stacks 10, said openings being of such diameter as to slidably accommodate the plungers 36. The rear wall 32 is provided with rectangular openings 37, said openings being of greater diameter than, but forming continuations of, the slots 28, and being provided for the purpose of accommodating the end 38 of the plunger carriage, which is generally designated by the reference character 39. The top 30 of the actuating mechanism support 27 is provided with a plurality of outwardly punched ears 40, which form sliding guides for the limiting bars 41. The rear walls 18 of the stacks 10 are attached at their lowermost edges by welding or other means to the rear support member designated generally by the reference character 42, said rear support members being provided with a downwardly extending flange 43 on one side and an upwardly extending flange 44 along the opposite side. The attachment of the stacks is to the flange 44. The support member is provided with the openings 45 for the accommodation of the lower ends 46 of the vertical release members 47. The ends 48 and 49 of the rear support member 42 are integrally formed and open from the body of the said member 42. The right end 48 is provided with the flange 50 extending parallel to the support member and being provided with openings to accommodate screws 51 for fastening the support to the lower flange 52 of the coin mechanism 53 by means of the nuts 54.

The opposite end 49 of the rear support member 42 bears against and is fastened to the left side support plate 55 by means of the screws and nuts 56.

The left support plate 55 is provided with a flange 57 extending its entire length and is fastened to the front mechanism support 27 by means of the screws 58 and associated nuts. The front edge of the left support 55 is recessed at 59 to permit ease in formation of the flange 60. Said flange 60 is pierced to provide a plurality of openings 61' for attachment of the ends of the mechanism springs 62. The right end 34 of the front mechanism support 27 is attached to the coin mechanism 53 by means of screws 61 and associated nuts.

The stacks 10 are maintained in fixed relationship to one another and to the supporting members at the bottom of the stacks as hereinabove described. These stacks are further tied together at their top portions by means of a tie strip 62', which is fastened along the front of the stacks adjacent the uppermost ends of the flanges 18 by welding or in some other suitable manner. The stacks are further maintained in fixed relationship by reason of their being fastened by welding or other means to the upper release member support 63. The said support 63 is of channeled cross-section for transverse bending strength, and is provided with a plurality of embossed openings 65, which provide sockets for the maintenance of the upper end of the vertical release members 47.

It will be noted that by reason of their construction, the stacks 10 will be open on their right sides. This open side, however, will be closed by the side wall 14 of the next adjacent stack, except the stack on the extreme right-hand side, which stack, however, will be closed by the substantially rectangular plate 65', said plate being permanently secured in place by welding or in some other suitable manner.

It will be seen from the above description how the framework and supporting structures are formed for the device, and it will be also apparent that the construction of the framework is such as to lend itself to be manufactured entirely by stamping operations.

The actuating mechanism comprises the plunger 36 provided with a handle or knob 66 at its forward end and with a circumferential groove 67 at its opposite end, said groove accommodating the end 38 of the plunger carriage 39. A helical coil spring 68 is provided between the carriage end 38 and the front wall 31 of the support 27 for normally urging the plunger inwardly or to the right as viewed in Fig. 6. The plunger carriage 39 consists of a supporting plate member 69, one end of which is bent downwardly to form the portion 38. Said portion 38 is cut and pierced as at 70, so that the sections thus formed may be spread to accommodate the end of the plunger and are then bent back to shape, thus fixedly engaging the groove 67 and serving to support the carriage 39. Upon the plate 69 are supported the guide strips 71, which are of slightly lesser width than the slots 28 within which said guide strips are adapted to be guided. There is disposed upon this guide strip 71 a rider plate 72, which is of greater width than the diameter of the slot 28. The three plates 69, 71 and 72 are fixedly secured to each other in any suitable and well-known manner, such, for example, as by means of a rivet 73 adjacent one end thereof, and the other end of said plates are secured to each other by means of the reduced portion 74 formed on the lower end of the actuating bar 29, said reduced portion performing the function of a rivet for holding said plate members together. The carriage is adapted to carry and operate the rod 75, which connects the release mechanism with the actuating mechanism. The rod 75 extends through a slot 76 formed in the end 38 of the carriage 39 and thence through an opening 77 drilled through the carriage plates 69, 71 and 72. The end of the rod 75, as shown in Fig. 6, is bent at right angles to provide the upstanding portion 78 which extends through the opening 77, as shown in said Fig. 6.

The forward end of the rider plate 72 is formed as a wedge 78' adapted to engage the recess 79 formed between the abutting edges of the limiting bars 41. It will be noted in Fig. 4 that each of the limiting bars has a portion cut away adjacent one corner thereof, as shown at 80, to form this recess 79. As explained above, the limiting bars are guided by a plurality of ears 40 struck up from the actuating mechanism support 27. The said bars 41 are normally urged to the right, as viewed in Figs. 2 and 4 by the action exerted on said bars by means of the spring 81, one end of which spring engages within an opening 82 in the limiting bar 41, which is disposed at the extreme left-hand end of the device, and the other end of which spring engages in an opening 83 formed in the mechanism support 27.

The spring 81 is coiled about the lower portion of the shaft 25 of the cam mechanism furthest to the left of the device as best shown in Fig. 2. The force exerted by the spring 81 is transmitted to all of the limiting bars 41 by reason of their abutting each other, and the motion in that direction is limited by the bar 84, which is fixed to the support 27 at its extreme right end perpendicularly to the limiting bars 41, as shown in Fig. 2.

The purpose of the limiting bars 41 is to prevent any other plunger from being pulled forward when any one plunger is pulled forward. This is done in the following manner: When one of the plungers 36 is pulled forward the rider wedge 78' engages the recess 79 and as the plunger is pulled forward to the limit of its forward motion, the rider plate will force all bars 41 disposed on its left to move in that direction. The result of this movement will be to place the corners 85 of the bars 41 directly in the paths of all of the rider wedges 78' which are to the left of the plunger which has been pulled forward, preventing these other plungers from being pulled forward.

Now, the bars 41 disposed to the right of the plunger 36, which has been pulled forward, are prevented against movement to the right by the bar 84, and against movement to the left by the rider bar 72 of the particular plunger carriage 39, which has been pulled forward. The rider bar 72 is now disposed between the abutting edges of a pair of the bars 41, as viewed in Fig. 4, in which position it will, of course, be effective for preventing movement to the left of any of the limiting bars disposed on its right. Thus, it will be seen that only one plunger can be pulled forward at any one time.

Positioned upon each of the shafts 25 and disposed between the support 27 and the guide member 21 are a plurality of cam or pivoted lever members 86. In the embodiment shown, there are three of such cam or pivoted lever members 86 disposed upon each of the shafts 25. But, it is understood that the device is not limited to that particular number of cam or pivoted lever members, as any desired number may be employed, depending upon the price at which the articles disposed within the stacks are to be sold. The cam or pivoted lever members 86 arranged on any particular shaft 25 are, as will be hereinafter more fully explained, adapted to operate either singly or in combinations of two or more. Each of said cams is formed integrally with a downwardly bent spaced bracket 87, provided with an opening 88, which is disposed in alignment with a similarly shaped opening 89 formed in the body of the cam member 86, said openings being provided for the accommodation of the shaft 25. Said openings 88 and 89 are provided with bosses 90 and 91, respectively, to form bearings for the cam member 86 around the shaft 25.

The cam members 86 disposed at the extreme right end of the device are provided with an outwardly extending arm 92, as shown in Figs. 2 and 8 and in the broken lines of Fig. 20, said arm 92 being provided with a roller 93, which is riveted in place and which serves to engage the jaws of a portion of the coin-control mechanism to be hereinafter more fully described.

Each cam member is also provided with a jaw 94, which serves to engage the actuating bar 29. In addition to the jaw 94, the cam members arranged in the bottom row of each of the assemblies may be provided with an additional jaw 95, as shown in Fig. 20A. Thus, it will be noted that the entire bottom row of cams would be provided with two integrally formed jaws for engaging the actuating bar 29. The cam members 86 are each further provided with a movable member 96, comprising a jaw 97 having a downwardly bent flange 98, a body portion 99 and two ears bent up from the body portion at 100 and 101. The ear 101 slides along an extension 102 of appropriate shape provided therefor on the cam 86. The ear 100 extends through an arcuate slot 103 formed in the cam 86 and is provided with an opening 104, through which passes an arm 105 of a coil spring 106, the other arm 107 of which is held by ear 108 struck up from the cam member 86 and an opening 109 formed in the cam for the end of the arm 107. Obviously when the type of member 86 shown in Fig. 20A is used in the bottom row, there is no need for a movable member 96 to be associated with said members 86.

The spring 106 is arranged by reason of the bend 110 to normally retain the movable member 96 in the position shown at the left-hand side of Fig. 4, with the jaw 97 substantially out of the path of the bar 29 when it is pulled forward. If it is desired that the cam shall engage with the bar 29, the ear 101 is moved to the left, as viewed in Fig. 19, causing the jaw 97 to swing out and into a position approximating that of the jaw 95 provided on the lowermost cam in each assembly. The ear 100 will move to the left and will be held there by reason of the arm 105 of the spring 106 and will be held in such position by the bend provided in said spring at 110.

The movable member 96 and its associated cam member 86 are pivotally attached by the pin 111, which also attaches the same to a transverse bar 112, there being three of such transverse bars, as shown in Fig. 1 of the drawings, one for each horizontally disposed row of cam members 86. The bars 112 extend substantially across the entire length of the device and are normally urged to the left, as seen in Figs. 1 and 2, by the coiled springs 62, which springs are attached at one end to the flange 60, as explained above, and at their other ends to the bars 112 by means of pins 113 secured to said bars. Thus, the cams are swung around in a clockwise direction, as viewed from above by the spring 62 cooperating with the bars 112, and the motion of the cams 86 in this direction is limited by the outer side of the jaws 94 bearing against the back wall of the guide member 21, as shown more clearly in Fig. 2 of the drawings.

From the above, it will be noted that as one of the cam members 86 in any row of cams is swung around by the actuating bar 29 of its plunger carriage 39, it causes the transverse bar 112 of that particular row to move to the right. This causes the cam 86, which is on the extreme right of the device and in the same row, to be moved in a counterclockwise direction, as viewed from the above, causing the roller 93 on the arm 92 to engage the jaws of a portion of the coin-controlled mechanism for a purpose to be now more fully described.

The coin-control mechanism is generally designated by the reference character 53 and comprises a main plate 114 to which is attached an auxiliary plate 115 by means of the screws 116 and associated nuts 117. The openings for the screws 116 are struck inwardly in the plate member 115 forming the bosses 118, as shown in Fig. 9. The openings 119, which are provided through the plates 114 and 115 are also struck downward to form bosses similar to the bosses 118. The bosses maintain the plates 114 and 115 in spaced relationship with the distance between them being slightly greater than the coin for which the mechanism is designed.

In the embodiment shown, the space between the plates is of a size to correspond to the thickness of a five cent piece. The main plate 114 is substantially rectangular in shape and is provided at its bottom with a flange 52, which is further provided with openings 120 for the accommodation of the screws 54, which secure the coin-control mechanism to the rest of the device. The central portion of the plate 114 is cut out at its upper side to provide for the attachment thereto of a coin chute 123. This coin chute is of standard construction, and as the same forms no part of the present invention, it is not thought necessary to describe the same in more detail.

The coin chute 123 is attached to the plate 114 by means of a pair of offset extensions 121 and 122 provided on the plate 114, said extensions having openings provided therein for the reception of the screws and nuts 124 by means of which the coin chute is rigidly secured in operative position on the device. The plate 114 is provided with a pair of inwardly extending spaced ears 126 and 127, within which is mounted a shaft 128, said shaft being held in place in said ears by the cotter pins 129 and washers 130 interposed between said pins and ears. Mounted upon the shaft 128 are three spring release members 131. Each of said members 131 is substantially channel shaped in cross-section, the channel arms 132 being shaped at one end to form ears 133 provided with openings 134 for slidably engaging the shaft 128.

Two lugs are struck down from the body of the member 131, one of said lugs 135 extending perpendicularly therefrom and being formed at the free end thereof and the other of said lugs 136 being arranged at an acute angle to the body of the member, as shown in Fig. 22. The plates 114 and 115 are drilled at 137 to allow the lugs 135 to project through and are further drilled with holes 138 of slightly larger diameter than the holes 137 to allow the lugs 136 to project through the plates. Each of the release members 131 is provided with a coiled spring 139 which is maintained about the shaft 128 between the ears 133 with one arm 140 of said spring bearing against the plate 114 and the other arm 141 bearing against the member 131 in such a manner that the member 131 is normally urged to bear against the plate 114.

The plate 114 is further provided with a plurality of relatively narrow slots 142 for the accommodation of the sliding members 143. One of these members is shown in perspective in Fig. 21. Each of the members 143 consists of an angle portion 144 and the coin actuating portion 145.

The angle portion is provided with a bent over portion 146, which is adapted to engage one of the slots 142. One end of the bent over portion is provided with integrally formed jaws 147, which are adapted to slidably engage one of the rollers 93 provided on the arm 92 of the cams 86 disposed at the extreme right of the device, as shown in Fig. 2 of the drawings. To the lowermost one of the sliding members 143 is secured a substantially rectangular shaped plate 150 by means of rivets 149, the lower edge of said plate member being serrated, as shown at 151, for a purpose to be presently more fully described, said member 150 being spaced from the face of said member 143 by means of the rectangular spacing member 151'.

Each of the members 143 is provided with a coin portion 145 of substantially the same width as the diameter of the coin for which the mechanism is designed. By reason of the recess 153 on the end of the portion 145, two prongs 154 are formed which are adapted to push the coin against the lug 136. It will be seen that the portion 145 is somewhat offset from the bent portion 144, as shown at 155 and 156. Thus, when a plurality of the members 143 are placed on top of one another, the bottom edge of the portion 144 of one will rest on the portion 146 of the one immediately below it. With the plurality of the slide members 143 arranged as above described, it will be seen that it is possible to move any member to the right or left, providing that all of the members below that particular member are also moved. However, if an attempt is made to move any member without moving all of the members below it, the offset portion 155 on the bottom of one member is stopped by the offset portion 156 of the member directly below it which has not been simultaneously moved.

In the operation of the coin-control mechanism, motion of the sliding members 143 to the right, as viewed in Fig. 9, is limited by the bottom edge 157 of the recess 153 bearing against the lugs 135. When a coin is dropped into the device, it passes through the coin chute and down between the two plates 114 and 115 between the sets of screws 116, between the lugs 135 and 136, and comes to rest on the member 158, as shown in Fig. 9, in which position the coin will be disposed in the path of the lowermost sliding member 143 and between the lugs 135 and 136 of the member 131 disposed directly opposite this lowermost sliding member 143, and any additional coins dropped into the coin chute would be disposed directly above the lowermost coin in the positions shown in Fig. 9.

As the lowermost sliding member 143 is now moved to the right, as viewed in Fig. 9, by reason of one of the lower cam members 86 actuating the lowermost bar 112 and transmitting this motion to the roller 93 which engages the jaws 147 of the lowermost sliding bar 143 and causes such motion as shown in Fig. 8, the coin will be pushed against the slanting portion of the lug 136 by the prongs 154 which at this time project beyond the lug 135 to facilitate this action. The lowermost spring release member 131 will thus be pushed away from the plate 114 against the action of the spring 139, causing the lug 135 to also move outward and permit the sliding member 143 to move the length of its stroke, which will bring the bent-over portion 146 against the end of the slot 142 and the plate 114.

In the meantime, the member 158 upon which the lowermost coin had been supported, will have been moved to permit the coin to drop and to be deposited in a receptacle provided therefor. From its position on the member 158, the coin D will be pushed into the coin guide 159, said guide being formed integral with a cover member 160, which cover member is secured to the plate 114 by means of screws and nuts engaging the holes 162' formed in the member 160 and the plate 114.

It will be noted that where a plurality of coins has been placed in the device and the operator is desirous of purchasing a commodity which requires more than the motion of one cam member 86 of the desired assembly, the desired plunger is pulled out and by reason of the movable jaws 97 of the cams 86 on the assembly being arranged for engagement with the actuating rod 29, a plurality of the bars 112 will move to cause a similar number of the cams 86 in the extreme right-hand assembly to operate a corresponding number of rollers 93, which, in turn, will engage a corresponding number of the sliding members 143 to move the same to permit the depositing of the required number of coins simultaneously into the coin guide 159, thereby permitting the strokes of the sliding members 143 to be completed.

The motion of any or all of the sliding members 143 must be completed to the ends of the strokes to prevent fraudulent manipulation of the device, and this is accomplished by the following mechanism:

Pivotally mounted on the plate 115 is a pawl 162, the operating portion 163 of which is substantially rectangular in shape and includes the two corner portions 164 and 165. The pawl 162 is rotatably mounted by means of the rivet 166 and is maintained so that the operating portion 163 is normally in a vertical position by reason of the pull exerted thereon by a pair of coiled springs 167, which springs are attached to ears 169 provided on the pawl member 162 and to ears 168 struck up from the plate member 115. In operation, as the member 143 is moved to the right, the serrated edge 151 of the member 150 will engage the pawl 162 and move the same in a clockwise direction until the corner 164 engages the serrations 151, in which position the member 150 can continue moving to the right, but if this movement is stopped while the pawl 162 is still in engagement with the serrations 151, the motion cannot be reversed to the left because of the engagement of the pawl corner 164 with said serrations. However, when the stroke of the member 143 has been completed to such an extent that the member 150 has moved past the pawl 162, the pawl will again assume its normal substantially vertical position. When the stroke is reversed, the pawl member 162 will again be effective to prevent anything but a completed stroke for the member 143.

At the extreme right-hand side of the actuating mechanism support 27, the plunger 36' is arranged and disposed in the same manner as the other plungers 36. This is shown more clearly in Fig. 8. This plunger 36' is not adapted for engagement with a cam assembly and consequently does not in operation serve to actuate the bars 112 for the purpose described hereinbefore. The plunger carriage associated with the plunger 36' and designated by the reference character 39', is provided with a connecting rod 75' in the same manner as the rod 75 is connected to the other carriages, but the bar 29' is merely employed for the purpose of connecting the carriage 39' to the plate 72'. The connecting rod 75' is attached to the coin return lever 171 by means of a crank arm 172' formed on the end of said rod 75' and engaging within an opening 173 within the coin return lever 171.

The coin return lever 171 is rotatably riveted at 174 in the plate 114 and its lower end engages in a slot 175 provided in an offset portion 176 of a sliding bar 177. (See Fig. 10.) The upper end of the lever 171 is provided with a roller 171' and has attached thereto adjacent its upper end a coil spring 171'', one end of which spring is secured to the coin chute 123 and the other end of which is secured to said lever 171, said spring being effective for normally urging the rod 75' and the bar 177 to the left, as seen in Fig. 10.

To the bar 177 is fixedly secured a flange 178 by means of the screws and nuts 179, said flange being formed integral with the sliding member 161 hereinafter referred to, said member 161 being disposed against the plate 115 and being held in position against said plate member 115 by means of the cover member 160. (See Fig. 11.) At the free end of the bar 177 is secured the plate member 158, which extends through a slot 183 provided in the plate members 114 and 115, said member 158, as already explained, being adapted to support the coins deposited between the plate members 114 and 115 to hold the same in the position shown in Fig. 9 prior to the actuation of any of the plungers for releasing the mechanism.

The member 161 is adapted to ride within a slot 181 provided therefor in the plate member 114, as shown more clearly in Fig. 9, and the leading edge of said member 161 is provided with a plurality of recesses 182 adapted for clearing the lugs 136 to thereby allow the member 161 to push any coins which have become stuck under these lugs into the path provided for said coins between the lugs 135 and 136, which path will now be open by reason of the member 158 having been moved to the left at the same time as the member 161 has been moved. Movement of the member 158 is permitted by reason of its disposition within the slot 183 provided in the plate member 114.

From the above, it will be apparent that if the operator has deposited the coin in the mechanism and is desirous of getting the same back, or if he has placed other than a proper coin in the coin chute and it has been held or has become jammed therein by reason of the mechanism provided therefor in the coin chute, he actuates the plunger 36'.

If the coin has been jammed in the coin chute, the roller 171' on the lever 171 upon the actuation of the plunger 36' will engage a member 172'' which actuates the coin release of the coin chute, thereby causing a fraudulent or improper coin which may have become stuck therein to drop through a return chute 174', from which it may be discharged into a special receptacle 240 provided therefor, from which receptacle the operator can retrieve it. Simultaneously with the movement of the lever 171 upon the actuation of the plunger 36', there will be a movement of the bar 177 which will carry with it the members 158 and 161.

Movement of the member 158 will remove the support from under the coins disposed between the rows of lugs 135 and 136, allowing said coins to drop into the return chute 159' and thence to the receptacle 240 provided for the depositing of said coins. If the coin has become jammed in the space between the lugs 136 and the plate member 114, a member 161 will be effective to release said coins and to permit them to drop into said chute 159'.

The tie rods 75 are all provided with crank ends 172, as explained above, in connection with the coin release mechanism, and these ends 172 are adapted to engage an opening 184 provided therefor in the cam member 185. (See Fig. 13.) Each cam member 185 is fixedly attached to a plate member 186 by means of the screw and nut 187 and the washer 188. The members 186 and 185 are both provided with registering openings for receiving the shaft 46 and the member 186 is fixedly secured to said shaft by means of welding or in some other suitable and well-known manner.

It will be noted that as the rod 75 reciprocates back and forth in the operation of the device, the shaft 46 will have imparted thereto a corresponding movement to rotate the same within the opening 45 provided in the support member 42. The rods 75 pass through slots 189 formed in the upstanding flange 44 of the rear support member 42. Each of said slots is provided with an extension 190 of substantially reduced diameter, which extensions are adapted to accommodate and clear the arm 191 of the cam member 185. The upstanding flange 44 is also provided with a pair of struck-up guide lugs 192 which accommodate the lower substantially U-shaped portion 193 of the vertically disposed rod 194. This rod 194 is maintained in its position by the lugs 192 and a plurality of struck-up ears 195 spaced along the wall 13.

The uppermost end of the rod 194 is provided with a substantially perpendicularly bent portion 196 which extends through an elongated slot 197 provided in the rear wall 13 of the stack, and is adapted to rest upon the uppermost platform or shelf 11 when said shelf is in its normally horizontal position, as shown in Figs. 12 and 13.

In operation, as shown in Figs. 12 and 13, when the final bar of candy or other commodity is vended from any one of the stacks and the uppermost platform or shelf 11 has dropped from its horizontal to its vertical position, the bent portion 196 of the rod 194 will drop to the position shown by the dot and dash lines of Fig. 13. When in this position, it will be seen that the lower U-shaped portion 193 of the rod 194 will be in a position overlaying the slot extension 190, and will be disposed in the path of the arm 191, thus preventing the rod 75 from being moved forward, thereby indicating to the operator that the particular stack with which the particular plunger which he has operated is connected is emptied.

Obviously, the failure of the rod 75 to move forwardly by reason of its engagement by the portion 193 will prevent the actuation of the coin mechanism. The coin, therefore, will be returned to the operator by actuating the plunger 36', or the operator may choose a commodity in one of the other stacks which have not been emptied, and the actuation of the plunger of said other stack will, of course, discharge the article therefrom.

The shaft 46 which constitutes the lower end of the vertical release member 47 is rigidly secured by welding or the like to the lower end of the channel member 197, as shown in Fig. 3. This member 197 is of substantially channel shaped cross-section and is provided along its length at spaced intervals corresponding to the spaced positions of the merchandise platforms with horizontally extending lugs 198 which are bent from and integrally formed with the member 197. The member 197 is provided along its entire back with a strengthening channel bar 199. (See Fig. 14.)

The upper end of the vertical release member 47 comprises a threaded shaft 200, which passes through an opening 65 provided therefor in the member 63. (See Fig. 12.) The member 200 is rotatably maintained in the opening 65 by being passed through a sleeve 201 and fixedly maintained upon that sleeve by the nut 202, the washer 203, and the nut 204, as shown in Fig. 12, and is fixedly secured to the member 197 by welding or in some other suitable and well-known manner.

Each of the rear walls 13 of the stacks 10 is punched out, as shown in Fig. 13, with a plurality of horizontally extending lugs 205, a plurality of openings 206 for the pintles 20, a plurality of slots 208 of arcuate shape curving about the openings 206, each of said arcuate slots 208 being provided with a downwardly extending portion 209 at their lowermost ends. The openings and lugs and slots are arranged along the wall 13 in a spacing corresponding to that of the platforms 11 and for cooperation therewith.

The platforms 11 are operated by a release member, generally designated by the reference character 207 shown more clearly in Fig. 18, one of said release members being provided for the operation of each platform. Said release members comprise a plate member 210 rotatably attached to a hook arm 211 by means of the rivet 212. The hook arm 211 is provided with an arm 213, which has its end vertically bent as at 214 to form a rest arm. The top edge of the hook arm 211 is provided with an integrally bent ear 215, which maintains one end of a helical spring 216, the other end of which spring is attached to an ear 217 integrally formed and extending perpendicularly from the plate member 210. The spring is adapted to normally urge the lower edge of the member 211 to bear against the ear 217. The end of the member 211 opposite to the riveted end is hooked, as at 218. The plate member 210 is further provided with a finger 219 adjacent one end thereof and with a hook 220 formed from and bent perpendicularly to the plate member 210. One corner of the plate member has secured thereto one end of the pintle 20, the latter being fixedly riveted to the member. In assembling the platforms 11 within their stacks, the platform is placed in position in the stack and the pintle 20 is passed through the opening 206, with the release member 207 so positioned that the hook 220 is at the bottom and in alignment with the extension 209 of the arcuate slot 208. The pintle is then further passed through the opening 221 provided in the platform flange 222 and then through the opening 223 provided in the flange 224 formed at the opposite end of the platform 11 and out through the ear 19 which is provided with an appropriate opening for receiving the free end of said pintle.

As the pintle is being arranged in place, the hook 220 will pass through the extension 209 of the slot 208 and into the slot 225 formed therefor in the flange 222 of the platform 11. In this position, the entire release member 207 and the platform 11 have such a center of gravity that the hook 220 is slightly to the left of the extension 209, and movements of the release member 207 are communicated to the platform 11 and vice versa.

Now, when the platform is raised up, as in servicing the device, the hook 220 moves along the slot 208 and is guided by it and the arm 214 bears against the combined lugs 205 and 198, which are normally in the position shown in Fig. 12. As the hook 220 is moved further along the slot 208 by reason of the platform 11 being raised about the pintle 20, the member 211 revolves about the rivet 212 separating the ears 215 and 217, thereby placing the spring 216 under tension and causing a lifting of the hook 218. The plate member 210, together with the rivet 212 move upwards. Therefore, the arm 214 slides along the edges of the lugs 205 and 198, until it passes them, whereupon the spring 216 pulls the ears 215 and 217 together, snapping the arm 214 to the left and to a position of rest directly on the lug 198. This will be the position of the lowermost release member in the stack. As to those release members mounted above the lowermost release member, it will be noted from an examination of Fig. 12 that the arm 214 will be maintained in a position slightly raised above the lug 198, which position will be due to the fact that the hook 218 will be engaged by the hook 219 of the release member disposed directly below it, and in which position it will be maintained until such time as the release member directly below it has been actuated in a manner to be hereinafter more fully described.

From the above, it will be apparent that the platforms 11 may be successively released, starting with the lowermost one which, in its original position, will have the arm 214 resting directly on the lug 198, and from which position it may be released by the actuation of the member 197. The action that will take place upon the movement of the member 197 will be first to permit the arm 214 to drop onto the lug 205, and then when the lug 198 is returned to its original position, it will push the arm 214 off the lug 205, causing the release member 207 together with the platform 11 associated therewith, to drop to the position shown for the lowermost release member in Fig. 12, discharging the merchandise which had been deposited on said platform. With the dropping of the lowermost release member, it will be noted that the release member disposed directly above it will now have its arm 214 resting directly on the lug 198, so that on the next operation of the member 197, this release member will be acted upon in the manner hereinabove described in connection with the lowermost release member, to bring about a release of the platform 11 and the discharge of the merchandise supported thereon, and at the same time removing the hook 219 from supporting the hook 218 of the release member mounted directly above it. In this way it will be noted that the platforms 11 will be successively operated one after the other to discharge the merchandise until the last or uppermost platform has been actuated, at which time the rod 194 will drop to the dot and dash line position shown in Fig. 13, in which position it will prevent further actuation of the member 197, thus indicating to the operator that this particular stack has been emptied.

The operation of the device is as follows: Upon the depositing of a coin in the coin slot, the same will pass through the coin chute, providing it is a proper coin, and will come to rest in the coin-control mechanism between the lugs 135 and 136 of the lowermost release member 131. The plunger 36 of the desired stack 10 may then be pulled forward by the knob 66 moving the plunger carriage 39 forward and causing the bar 29 to rotate the bottom cam member 86 of the assembly of the desired stack, providing the upper two cams of that assembly have had their movable jaws 97 arranged so as not to engage the bar 29, while the bottom cam or pivoted lever member 86 has had its jaw 97 positioned to engage the bar 29 so that one coin will operate the unlocking of the stack.

Simultaneously, with the forward movement of the carriage, the wedge 78' will engage the limiting bars 41 separating said limiting bars to prevent the operation of any of the other plungers in the manner hereinabove described. As the cam 86 rotates, it will actuate the bar 112 to the right, which movement will transmit a rotary movement to the extreme right-hand cam of the device, the arm 92 of which cam will cause its roller 93 which is in engagement with the jaws 147 to move the member 143 to the rear. The movement of the member 143 will cause it to engage the coin deposited between the lugs 135 and 136 and to push the same against the lug 136, forcing the member 131 outwardly to a position where the lug 135 on said member will be pushed out of the path of the member 143, thereby permitting further movement of said member 143 to complete its stroke and at the same time to permit the discharge of the coin into the chute 159.

During this forward stroke of the plunger 36, the rod 75 associated therewith has been moved forward, actuating the member 185 which, in turn, will actuate the vertical release member 47 and move the member 197 to a position where all of the lugs 198 will be removed from under the arms 214 of the release members. This movement of the lugs 198 will not affect the position of any of the release members except the lowermost one, and as to this one, the moving of the lug 198 will permit the arm 214 thereof to drop directly on to the lug 205, from which position it will be removed upon the return of the lug 198 to its normal position, and as already explained above, this will cause a dropping of the lowermost platform discharging the merchandise supported thereon.

It is obvious that a plurality of coins may be dropped into the mechanism and the above operation repeated as many times as there are coins for delivering an item, the price of which is one coin.

If the item desired is a ten cent item, then the same will be disposed in a stack, the release for which will be operative only when two coins disposed one above the other of the proper character and denomination have been deposited in the coin chute, as shown in Fig. 9. The reason for that is, as already explained hereinabove, that the two lowermost cam elements associated with that particular stack have been set for actuation by the actuating bar 29, as shown at the extreme left-hand end of Fig. 4. When these cam elements 86 are so set, it will be readily understood that the actuating bar 29 will not release the mechanism unless two coins have been deposited in the coin chute. Similarly, if the item to be discharged is a fifteen cent item, all three of the cam elements 86 will have to be set, as shown for example in Fig. 4 at the right-hand side thereof, and in that case the actuating bar 29 will be permitted to operate only if there had been three coins of the proper denomination and character deposited in the coin chute and disposed, as shown in Fig. 9.

Thus, it will be noted, that each of the release mechanisms for each stack may be adjusted so as to discharge merchandise therefrom upon depositing in the coin chute either one or two or three coins, depending upon the arrangement of the cam elements 86 associated with the particular stack. By reason of such adjustment, it will be apparent that the device which is provided with a plurality of stacks may be set so as to vend a five cent article from one stack, a ten cent article from another stack, and a fifteen cent article from still another stack.

It will also be apparent that this adjustment to vary the price of the article to be discharged from any particular stack may be made from time to time as the device is loaded, the adjustment being a highly simple one requiring only the movement of the jaws 94 and 97 of the cam element 86 from the position shown for the upper cam element at the right-hand side of Fig. 4 to the position shown for the upper cam element at the left-hand side of Fig. 4.

The above-described may be installed in a display and operating cabinet, as shown in Fig. 23 and Fig. 24, or it may be embodied in any more or less permanent fixture to serve its purpose, as, for example, the housing designated in Fig. 1 as A.

In the embodiment shown in Figs. 23 and 24, the device is supported within the cabinet 226 by means of brackets 227, the support members 228 and 229, or by other similar means of like expediency. The front of the cabinet is provided with hinged portions 230 and 231, attached by the hinges 232 and 233 respectively, to the body of the cabinet 226. The portion 230 is provided with the coin escutcheon 234, which leads to the coin register, the locking device 235, and in the embodiment shown, a mirror or similar framed portion 236 for advertisement or the like, and swings upward when the cabinet is opened for servicing the device.

The portion 231 swings downward, and is provided with openings 237 for the plunger handles 36, windows or similar transparent portions 238 for the display or advertisement of the merchandise within the stacks, and a rectangular opening 239 to permit access to the trough 240, which either delivers merchandise from the stacks 10, or returned coins from the chutes 174' or 159', said trough 240 being attached to the bottom of the device in some manner, such as by welding.

The cabinet 226 is supported on a pedestal 241, as shown in the illustrated embodiment, but may be equally adapted for any other type of support.

It is believed that our invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of our invention as defined in the appended claims.

We claim:

1. In a device of the character described comprising a plurality of stacks for supporting commodities therein, operating means associated with each of said stacks for causing said commodities to be delivered from said stack one by one and normally held inoperative, a coin-control mechanism associated with said device for releasing said operating means, means for connecting each of said operating means with said coin-control mechanism including a plurality of pivoted lever members each associated with one of said operating means and movable upon actuation thereof, a single bar member movable when said coin-control mechanism is unlocked, and providing linking connection between each of said pivoted levers and said coin-control mechanism.

2. In a device of the character described comprising a plurality of stacks for supporting commodities, operating means associated with each of said stacks for causing said commodities to be delivered from said stack one by one and normally held inoperative, a coin-control mechanism associated with said device for releasing said operating means, means for connecting each of said operating means with said coin-control mechanism, including a plurality of pivoted lever members arranged in sets, each set being associated with one of said operating means and adapted to have one or more of its lever members movable upon actuation of said operating means, a plurality of bar members movable when said coin-control mechanism is unlocked, and each providing a linking connection between a correspondingly arranged lever member of each of all of said sets and said coin control mechanism.

3. In a device of the character described comprising a plurality of stacks for supporting commodities, operating means associated with each of said stacks for causing said commodities to be delivered from said stack one by one and normally held inoperative, a coin-control mechanism associated with said device for releasing said operating means, means for connecting each of said operating means with said coin-control mechanism including a plurality of pivoted lever members arranged in sets, each set being associated with one of said operating means and adapted to have one or more of its lever members movable upon actuation of said operating means and a plurality of bar members movable when said coin-control mechanism is unlocked, each providing linking connection between a correspondingly arranged lever member of each of all of said sets, each of the lever members of one of the sets being directly connected with said coin-control mechanism and being movable upon the unlocking of said coin-control mechanism.

4. In a device of the character described comprising a plurality of stacks for supporting commodities, operating means associated with each of said stacks for causing said commodities to be delivered from said stack one by one and normally held inoperative, a coin-control mechanism associated with said device for releasing said operating means, means for connecting each of said operating means with said coin-control mechanism, including a plurality of pivoted lever members arranged in sets, each set being associated with one of said operating means and adapted to have one or more of its lever members movable upon actuation of said operating means, a plurality of bar members movable when said coin-control mechanism is unlocked, and each providing a linking connection between a correspondingly arranged lever member of each of all of said sets and said coin-control mechanism, each of said lever members including a fixed and a movable jaw adapted to cooperate with each other to effect engagement with said operating means.

5. In a device of the character described comprising a plurality of stacks for supporting commodities therein, operating means associated with each of said stacks for causing said commodities to be delivered from said stack one by one and normally held inoperative, a coin-control mechanism associated with said device for releasing said operating means, means for connecting each of said operating means with said coin-control mechanism including a plurality of pivoted lever members each associated with one of said operating means and movable upon actuation thereof, a single bar member movable when said coin-control mechanism is unlocked, and providing linking connection between each of said pivoted levers and said coin-control mechanism, each of said lever members having a pair of jaws normally disposed to engage with its respective operating means upon actuation thereof.

6. In a device of the character described comprising a plurality of stacks for supporting commodities, operating means associated with each of said stacks for causing said commodities to be delivered from said stack one by one and normally held inoperative, a coin-control mechanism associated with said device for releasing said operating means, means for connecting each of said operating means with said coin-control mechanism, including a plurality of pivoted lever members arranged in sets, each set being associated with one of said operating means and adapted to have one or more of its lever members movable upon actuation of said operating means, a plurality of bar members movable when said coin-control mechanism is unlocked, and each providing a linking connection between a correspondingly arranged lever member of each of all of said sets and said coin-control mechanism, each of said lever members including a fixed and a movable jaw adapted to cooperate with each other to effect engagement with said operating means, said movable jaw being adapted to effect or not effect engagement between said lever member and the operating means associated therewith.

7. In a device of the character described comprising a plurality of stacks for supporting commodities, operating means associated with each of said stacks for causing said commodities to be delivered from said stack one by one and normally held inoperative, a coin-control mechanism associated with said device for releasing said operating means, means for connecting each of said operating means with said coin-control mechanism, including a plurality of pivoted lever members arranged in sets, each set being associated with one of said operating means and adapted to have one or more of its lever members movable upon actuation of said operating means, a plurality of bar members movable when said coin-control mechanism is unlocked, and each providing a linking connection between a correspondingly arranged lever member of each of all of said sets and said coin-control mechanism, said mechanism including a plurality of movable members each linked to one of said bars and movable only upon the unlocking of said mechanism to permit movement of said bars, said unlocking permitting movement of said members only in progressively cumulative amounts.

8. In a device of the character described comprising a plurality of stacks for supporting commodities, operating means associated with each of said stacks for causing said commodities to be delivered from said stack one by one and normally held inoperative, a coin-control mechanism associated with said device for releasing said operating means, means for connecting each of said operating means with said coin-control mechanism, including a plurality of pivoted lever members arranged in sets, each set being associated with one of said operating means and adapted to have one or more of its lever members movable upon actuation of said operating means, a plurality of bar members movable when said coin-control mechanism is unlocked, and each providing a linking connection between a correspondingly arranged lever member of each of all of said sets and said coin-control mechanism, said mechanism including a plurality of movable members each linked to one of said bars and movable only upon the unlocking of said mechanism to permit movement of said bars, said unlocking permitting movement of said members only in progressively cumulative amounts, each of said sets of lever members being provided with adjustable engaging means whereby one or more of the lever members from said set may be rendered available for engagement with a portion of the respective operating means associated with said set of lever members, said operating means being permitted to be actuated only when the number of movable members made movable upon unlocking of said mechanism corresponds to the number of lever members of said set the engaging means of which lever members have been previously adjusted to engage with said portion of said operating means.

9. In a device of the character described comprising a plurality of stacks for supporting commodities, operating means associated with each of said stacks for causing said commodities to be delivered from said stack one by one and normally held inoperative, a coin-control mechanism associated with said device for releasing said operating means, means for connecting each of said operating means with said coin-control mechanism, including a plurality of pivoted lever members arranged in sets, each set being associated with one of said operating means and adapted to have one or more of its lever members movable upon actuation of said operating means, a plurality of bar members movable when said coin-control mechanism is unlocked, and each providing a linking connection between a correspondingly arranged lever member of each of all of said sets and said coin-control mechanism, said mechanism including a plurality of movable members each linked to one of said bars and movable only upon the unlocking of said mechanism to permit movement of said bars, said unlocking permitting movement of said members only in progressively cumulative amounts, each of said sets of lever members being provided with adjustable engaging means whereby one or more of the lever members from said set may be rendered available for engagement with a portion of the respective operating means associated with said set of lever members, said operating means being permitted to be actuated only when the number of movable members made movable upon unlocking of said mechanism corresponds to the number of lever members of said set the engaging means of which lever members have been previously adjusted to engage with said portion of said operating means, each coin inserted in said coin-control mechanism serving to permit movement of one of said movable members, and said mechanism having means for making a plurality of such coins available for use in unlocking said mechanism.

10. In a device of the character described, comprising a plurality of stacks for supporting commodities, operating means associated with each of said stacks for causing said commodities to be delivered from said stack one by one and normally held inoperative, a coin-control mechanism associated with said device adapted to be unlocked releasing the operating means, each operating means being linkable with said coin-control mechanism by means including a plurality of pivoted lever members arranged in sets, each stack having one of such sets associated therewith, one or more of the lever members of any set being adapted to be engaged by a portion of the operating means of the stack with which same is associated, a plurality of bar members movable when said coin-control mechanism is unlocked, each one of said bar members being operatively associated with a correspondingly arranged lever member of each of said sets, whereby movement of any one of said levers will cause movement of the bar, each of said operating means including a plunger, and a member movable with said plunger, said engagement between the operating means and the lever or levers of said set being effected by engagement of said last mentioned member with said pivoted lever or lever members.

11. In a device of the character described comprising a plurality of stacks for supporting commodities therein, operating means associated with each of said stacks for causing said commodities to be delivered from said stack one by one and normally held inoperative, and a coin-control mechanism associated with said device adapted to be unlocked to release any one of said operating means, said coin-control mechanism having a movable portion adapted to be linked to each of said operating means, each of said operating means being connected to a pivoted lever member, each of said members being linked to one another by means of a single bar member so that all may pivot simultaneously upon pivoting movement of any one of said lever members, one of said pivoted lever members being directly connected with said movable portion of said coin-control mechanism.

12. In a device of the character described comprising a plurality of stacks for supporting commodities therein, operating means associated with each of said stacks for causing said commodities to be delivered from said stack one by one and normally held inoperative, and a coin-control mechanism associated with said device adapted to be unlocked to permit actuation of any one of said operating means, said coin-control mechanism having a movable portion adapted to be linked to each of said operating means, each of said operating means being connected to a pivoted lever member, each of said members being linked to one another by means of a single bar member so that all may pivot simultaneously upon pivoting movement of any one of said lever members, one of said pivoted lever members being directly connected with said movable portion of said coin-control mechanism, said operating means including a reciprocable plunger having a projection thereon adapted to engage with a pivoted lever member during movement thereof to cause pivotal movement of said lever member, said plunger being adapted to be reciprocated when it is desired that one of said commodities be delivered.

13. In a device of the character described, stacks for the accommodation of commodities, cyclical operating means associated with each of said stacks for causing the dispensing of said commodities from said stack one by one and normally rendered inoperative, only one commodity being dispensed upon each cycle of said operating means, and means releasing said operating means including a plurality of pivoted lever members arranged in layers, each stack having a set of such levers associated therewith comprising one lever member in each of said layers, said set serving to release the operating means of its respective stack by having a given number of its lever members made available for rotative motion, a coin-control mechanism including a plurality of movable members arranged side upon side, each member being linked with one of said layers, each lever member of said layer being linked to one another, said coin-control mechanism being adapted to be unlocked by means of appropriate coins, the number of coins corresponding to the number of movable members rendered movable to thereby release a corresponding number of layers of said levers for a single cycle of operation of the operating means of a chosen stack, a given number of the lever members of said stack having been made available for rotation, said operation occurring only upon the number of said lever members made available for rotation corresponding to the number of coins inserted in the coin-control mechanism.

14. In a vending machine of the character described, including a plunger adapted to be reciprocated to dispense merchandise, means locking said plunger against reciprocatory movement including a set of commonly pivoted lever members, a bar member adapted to move with the plunger, each of said pivoted lever members being provided with a fixed and a movable jaw, said bar member being normally disposed to engage between the jaws upon reciprocation of the plunger, said movable jaws being adjustable to positions where movement of said plunger will cause engagement between said bar and one or more of said pivoted lever members, and means releasably holding each of the engageable lever members against rotation.

HARRY B. STONER.
ROBERT D. STAYTON.